United States Patent [19]

Murray

[11] 4,339,203
[45] Jul. 13, 1982

[54] AGGREGATE STORAGE ANTI-SEGREGATION ARRANGEMENT FOR A STORAGE BIN

[75] Inventor: Donald L. Murray, Appleton, Wis.

[73] Assignee: Allis-Chalmers Corporation, Milwaukee, Wis.

[21] Appl. No.: 164,335

[22] Filed: Jun. 30, 1980

[51] Int. Cl.³ .............................................. B28C 5/04
[52] U.S. Cl. ....................................... 366/9; 414/293
[58] Field of Search .................. 366/9, 2, 6, 7, 8, 341, 366/348, 349, 183, 182, 178; 414/293, 201, 202, 203, 204, 205, 206

[56] References Cited

U.S. PATENT DOCUMENTS 2,814,478 11/1957 Loon .................................... 414/201
3,945,511 3/1976 Delorme ............................. 414/293
4,252,485 2/1981 Propster ............................. 414/293

FOREIGN PATENT DOCUMENTS 959155 9/1949 France .................................... 366/9

Primary Examiner—Robert W. Jenkins
Attorney, Agent, or Firm—Robert C. Jones; Thomas G. Anderson

[57] ABSTRACT

An asphalt mixture storage bin in which an anti-segregation device is incorporated to eliminate the segregation of large aggregate pieces in a uniformly blended asphalt mixture as the mixture is transferred to a storage bin. The anti-segregation device is constructed of plate steel and is rolled and welded into a frustrum of a cone and suspended in the stream of aggregate discharging from a conveyor. The arrangement causes the material to form a small central conical pile and an uneven but conically peaked series of deposits forming a donut-like configuration around the central conic pile.

3 Claims, 2 Drawing Figures

AGGREGATE STORAGE ANTI-SEGREGATION ARRANGEMENT FOR A STORAGE BIN

BACKGROUND OF THE INVENTION

Asphaltic concrete is made up of a blend of aggregate sizes and bitumen binder. This coated aggregate drops off the conveyor at a trajectory which is determined by their size, shape and density. This has the tendency to segregate the larger sizes from the smaller resulting in a non-uniform mixture in the storage bin. As the mixture forms a conical pile in the storage bin, it further emphasizes the tendency to segregate.

Current practice to overcome this segregation problem is to mechanically operate batch hoppers which, in effect, is the accumulation of a quantity of the material and depositing it into the storage bin at selected time intervals in individual batches.

Another method currently practical utilizes a multichute splitter which divides the flow and forms a series of piles loading the storage bin unevenly.

Both devices operate with mechanical mechanisms, making maintenance a field problem and are also potential areas of failure. These devices are also expensive, thereby increasing the asphalt plant cost.

SUMMARY OF THE INVENTION

According to the present invention, an anti-segregation arrangement of relatively simple construction and having no moving parts is provided. Basically, the device is a frustrum of a cone which may be so constructed as to form an ellipse. The device is mounted within the storage bin by means of struts directly beneath the top opening in the bin below the discharge end of a conveyor. Mixed asphaltic concrete is discharged from the conveyor and drops through the top opening in the bin spilling upon the anti-segregation device. The top elliptical opening in the anti-segregation device is located at a distance from the discharge end of the conveyor which is approximately the conveyor width. The body of the device is formed with a slope of 60° and defines a bottom elliptical opening which is approximately the width dimension of the conveyor. With the arrangement provided is an inner cone of material surrounded by an outer conical ring of material formed for an even bin load utilizing the entire bottom surface of the bin.

It is the general object of the present invention to provide a material anti-segregation arrangement specifically designed to cause material to deflect in a specific manner.

Still another object of the present invention is to provide an asphaltic concrete aggregate anti-segregation device which is simple in construction having no mechanical moving components.

Yet another object of the invention is to provide an anti-segregation device to form the rings of material in the storage bin in a manner that the larger ring of material, when it collapses upon itself, reblends any materials which has segregated from it.

DESCRIPTION OF THE INVENTION

Figure 1:
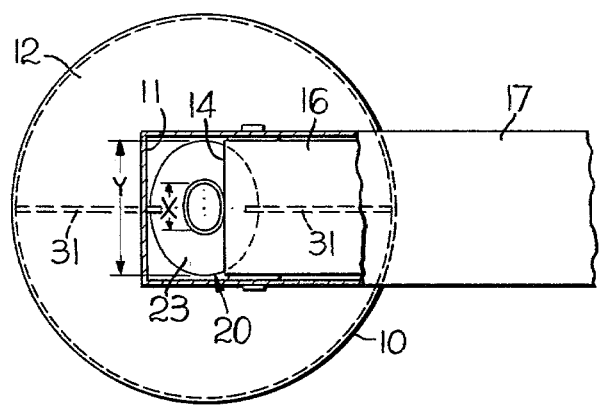
FIG. 1 is a top plan view of an asphalt concrete storage bin showing the conveyor and the anti-segregation arrangement of the present invention.
Figure 2:
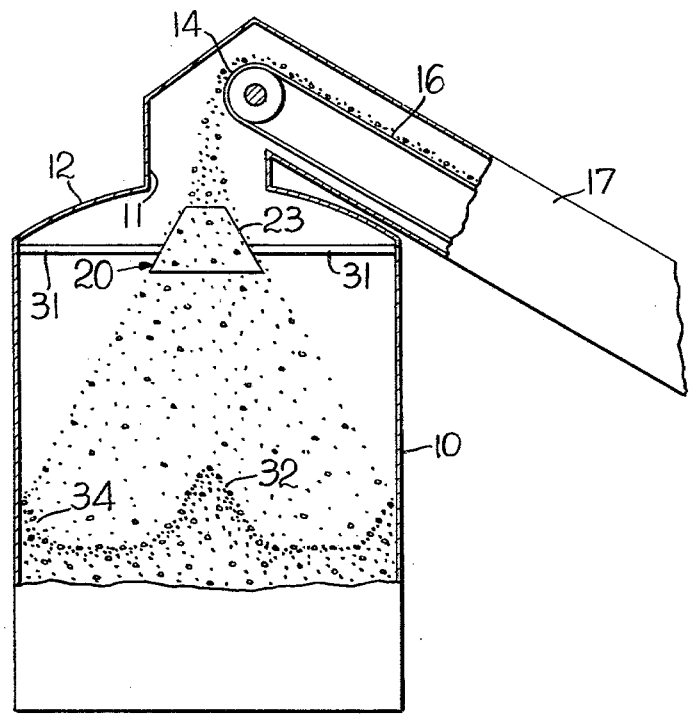
FIG. 2 is a view partly in elevation and partly in section of the asphalt concrete mixture storage bin depicted in FIG. 1.

As shown in the drawing, the reference number 10 denotes a circular configured storage bin or silo. Entrance of the asphalt concrete mixture into the bin 10 is through an opening 11 formed in the roof or cover 12 of the bin 10. The discharge end 14 of a material conveyor 16 has access to the bin opening 11 through a connecting shed or housing 17. Material discharging from the conveyor normally drops to the bottom of the bin in a trajectory determined by the size, shape and density of the particles making up the mixture. When the particles of aggregates accumulate at the bottom of the bin, they will form a conical pile accentuating the tendency which the material has to segregate.

To eliminate this problem of segregation in asphalt concrete, material being stored in an anti-segregation device 20 is provided. As shown, the device 20 is fabricated of plate steel and is rolled and welded together to form a frustrum of a cone which is preferred to form slightly elliptical configuration. The top or small opening of the cone has a major axis "X" which is one-third of the width dimension of the conveyor 16. The bottom of the anti-segregation cone 20 has a major axis "Y", the dimension of which is three times that of the major axis "X" of the top opening. The surface 23 of the cone 20 from the top to the bottom has 60° slope.

Suspension of the anti-segregation cone 20 within the bin 10 is accomplished by means of a plurality of struts 31. Location of the cone 20 is such that the small top opening thereof is positioned a distance from the discharge end 14 of conveyor 16 which is approximately the width dimension of the conveyor.

With the arrangement shown, the asphalt concrete mixture spilling off the end of the conveyor 16 drops through the bin opening 11 spilling upon the anti-segregation cone 20. Thus, a portion of the asphalt concrete mixture drops through the top opening of the cone and falls to the bottom of the bin. The remaining falling material impacts on the sloping surface of the cone and slides off falling to the bottom of the bin being deposited around the internal periphery of the bin. Thus, the material dropping through the opening in the anti-segregation cone 20 forms an inner cone of material 32 in the bin while the material sliding off the surface of the cone forms an outer conical ring of material 34 around the center cone of material 32. Thus, when the outer ring of material 34 collapses upon itself, it tends to reblend the particles of material that had segregated, if segregation had occurred. This is also true of the center pile 32, as it grows in size it will tend to collapse. Thus, the outer ring 34 of material and the center pile of material 32 in collapsing tend to reblend.

With the anti-segregation device 20 positioned as described, the asphalt concrete material discharging from the conveyor falling the relative short distance that exists between the discharge end 14 of the conveyor and the top of the conic frustrum does not permit the falling material to naturally segregate prior to the material striking the device 20. Therefore, the material is diverted into two continuous axially related circular piles, each of which include a proportional representation of the asphalt concrete particles, all of which tend to reblend when the outer ring of material collapses upon itself.

The embodiments of the invention in which an exclusive property or privilege is claimed are defined as follows:

1. In a storage bin for asphaltic concrete materials having a top opening through which such materials are fed into the bin from the discharge end of a conveyor, an anti-segregation device of an essentially downwardly diverging frustoconic configuration suspended within the bin near the top opening including an upper end portion forming a generally elliptically-shaped upper opening extending through the device wherein the major axis of said opening is aligned to extend transversely of the flow of the materials as they are fed into the bin from the conveyor, whereby, a predetermined portion of the materials fed into the bin flow through the upper opening and fall toward the base of the bin to form a relatively small pile of the materials in the center of the bin while the remainder of the materials spill onto the device and flow outwardly from its periphery to form a ring of the materials around the pile in the center of the bin to promote peripheral intermixing of the materials in the ring as well as between the ring and the pile.

2. An anti-segregation device according to claim 1 wherein the upper end portion is positioned at a distance below the discharge end of the conveyor a distance which is approximately the same as the width of the conveyor.

3. An anti-segregation device according to claim 2 wherein the diameter of the upper opening along its major axis is approximately one-third of the width of the discharge end of the conveyor and the diameter of the lower end of the device is approximately the same as the width of the discharge end.

* * * * *